May 13, 1952     G. F. BROCKETT     2,596,366
SNAP ACTING PNEUMATIC PRESSURE PILOT
Filed Feb. 19, 1946     3 Sheets-Sheet 1

Inventor:
Glenn F. Brockett.
By Baird & Freeman
Attys.

May 13, 1952     G. F. BROCKETT     2,596,366
SNAP ACTING PNEUMATIC PRESSURE PILOT
Filed Feb. 19, 1946     3 Sheets-Sheet 2
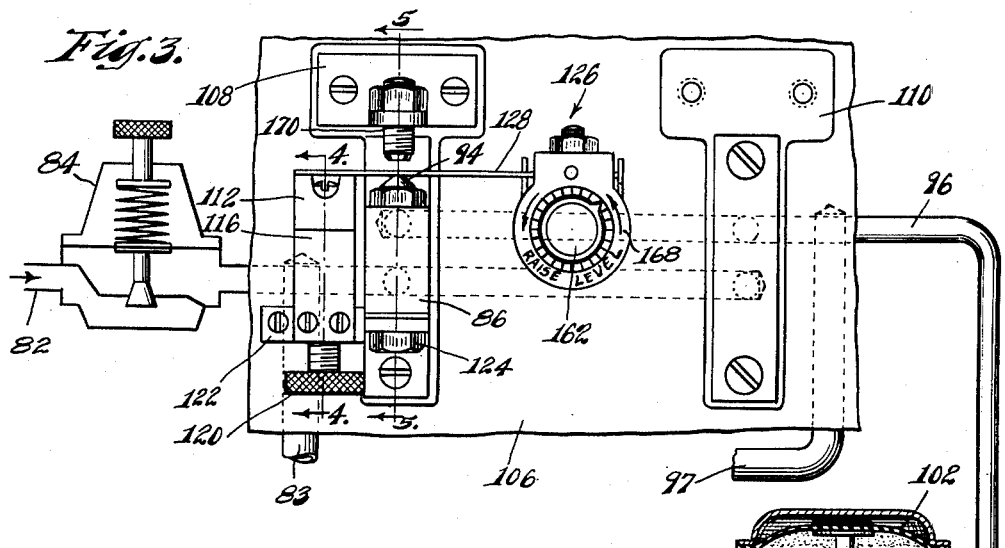
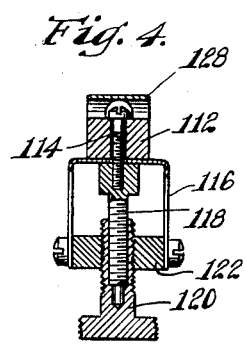
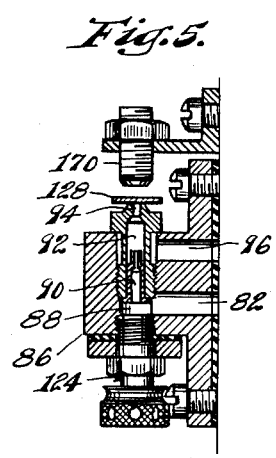
Inventor:
Glenn F. Brockett.
By Bair & Freeman
Attys

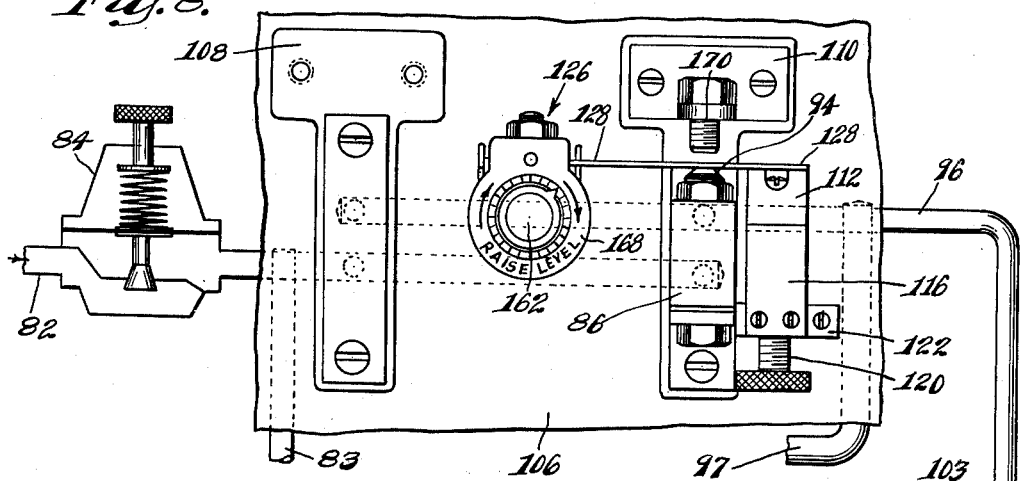
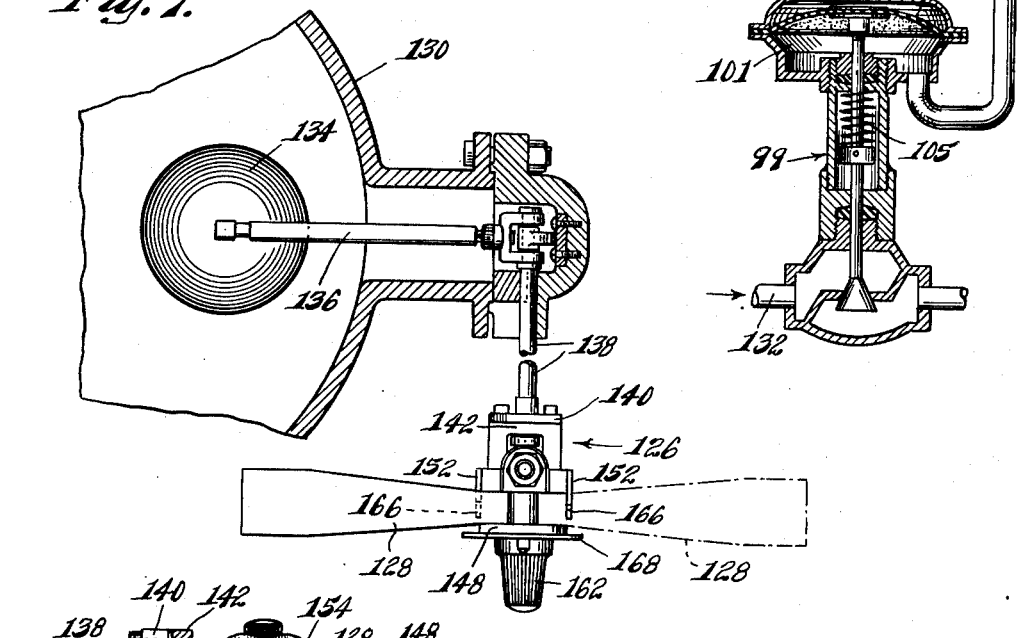
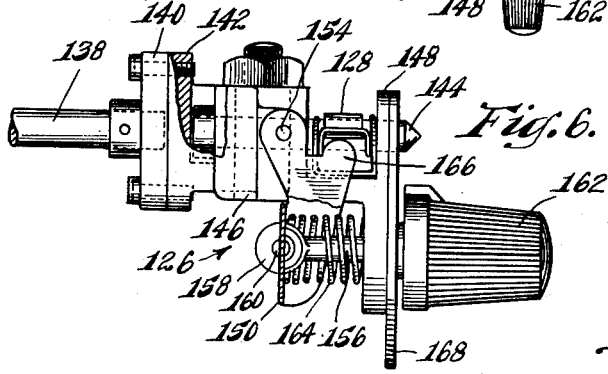

Patented May 13, 1952

2,596,366

UNITED STATES PATENT OFFICE 2,596,366

SNAP ACTING PNEUMATIC PRESSURE PILOT

Glenn F. Brockett, Marshalltown, Iowa, assignor to Fisher Governor Company, Marshalltown, Iowa, a corporation of Iowa Application February 19, 1946, Serial No. 648,668

3 Claims. (Cl. 137—153)

This invention relates to pneumatic pressure pilots, and particularly the quick acting, or snap acting type.

Three principal elements of the pilot of my invention consist of a flapper for closing a bleed port of an air pressure system, magnetic means for moving the flapper to port closing position, and an operating means for moving the flapper to port opening position.

I have provided that in the operation of the flapper energy is stored up to such a point that once the flapper is moved it is done quickly. This may be done either by making the flapper itself flexible, or providing similar action in the means for operating the flapper. The flapper is held in port closing position by a magnet, and when the force tending to move the flapper to port opening position comes into play, it builds up energy gradually which overcomes the attraction of the magnet and does so decisively and virtually instantaneously.

The invention is adaptable where air pressure is utilized as an operating medium, or where it is used as a control medium.

An object of the invention is to provide that where air pressure is used to cause flow from an oil well, the pilot automatically permits flow when the air pressure is sufficiently high and cuts it off when the air pressure drops below the desired minimum. In this instance the pilot is operated from the same source of air pressure as that used for the well.

Another object of the invention is to provide automatic liquid level control. The pilot is operated by a source of air pressure, and controls valve means for the liquid. The action of the air pressure on the pilot is responsive to the level of the liquid being controlled.

Still another object is the provision of a quick acting, and therefore quickly responsive pilot.

A further object is the provision for reversing various of the parts of the device and accordingly reversing its action.

A still further object is the provision of simple means for adjusting the range of operation of the pilot. This range can be adjusted as to its limits and its position.

With these and other objects in view, my invention consists in the construction, arrangement and combination of the various parts of my device, whereby the objects contemplated are attained, as hereinafter more fully set forth, pointed out in the claims, and illustrated in the accompanying drawings, in which:

Fig. 3 is a view partly in plan and partly in diagram of another form of control device;

Fig. 4 is a sectional view taken on line 4—4 of Fig. 3;

Fig. 5 is a sectional view taken on line 5—5 of Fig. 3;

Fig. 6 is an enlarged side view of the liquid level setting device of Fig. 3.

Fig. 7 is a fragmentary view of a tank in horizontal cross section with the liquid level setting device connected to a float mechanism; and Fig. 8 is a view similar to Fig. 3 with some of the parts reversed for reversing the action of the device.

Figure 1:
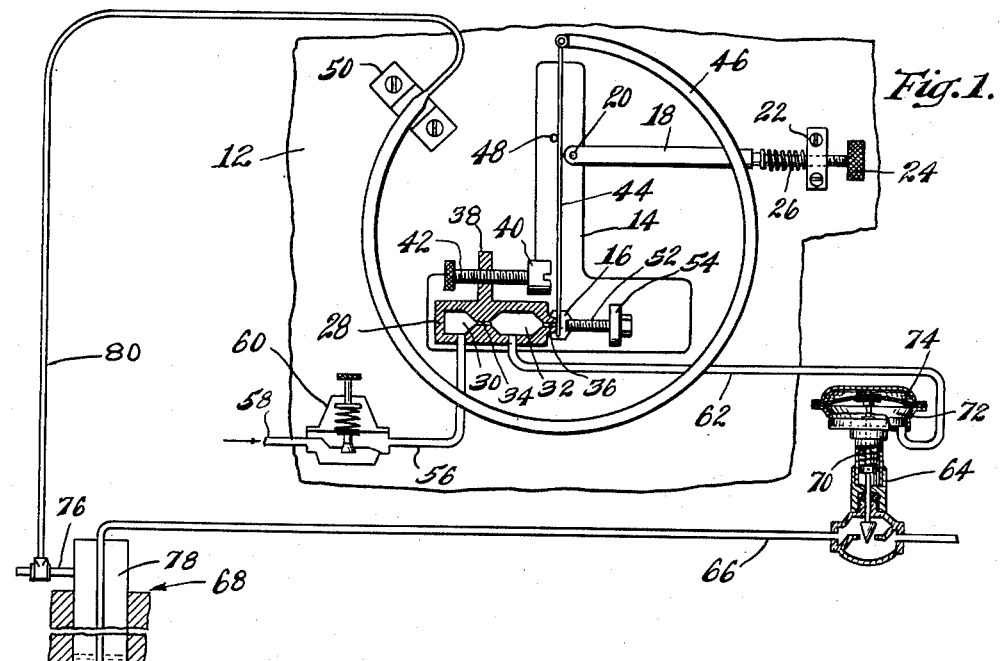
Fig. 1 is a view partly in section and partly in diagram of one form of control device.
Figure 2:
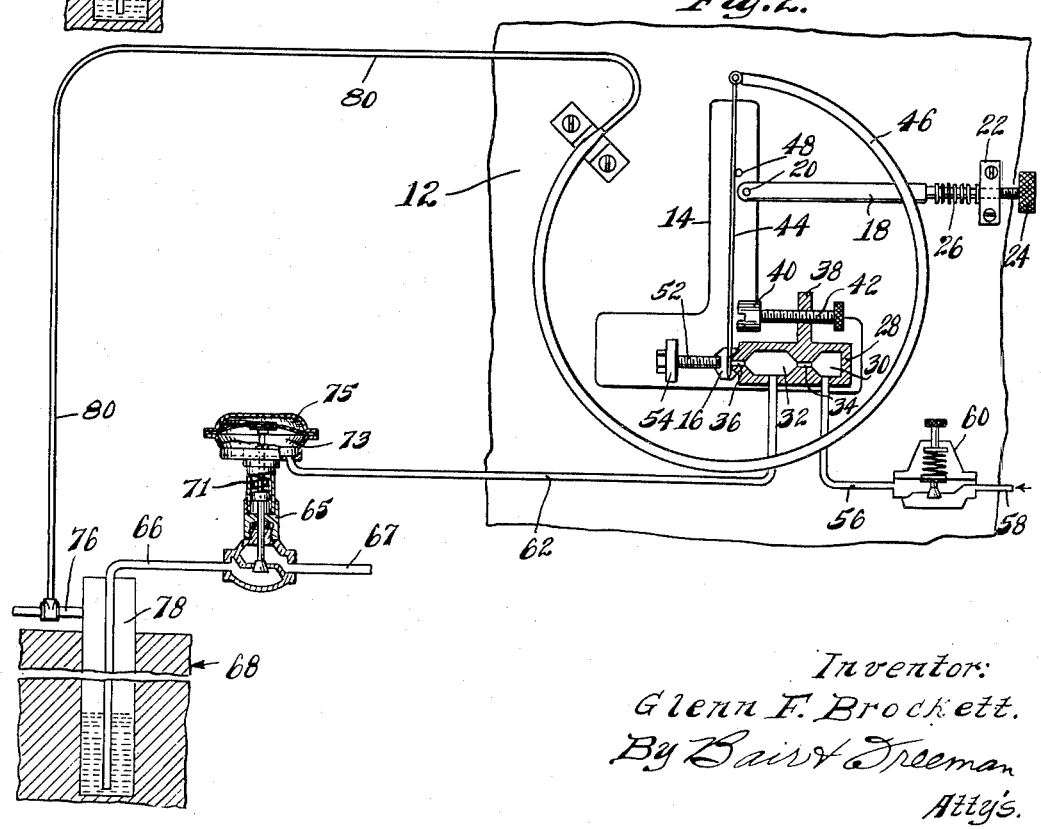
Fig. 2 is a view similar to Fig. 1, with some of the parts reversed for reversing the action of the device.

Referring now in detail to the drawings, it will be observed that various items are exaggerated in size for the purpose of showing them more clearly. Figs. 1 and 2 show a control pilot for controlling air pressure for operating a diaphragm motor valve. Its essential parts consist of a supporting panel 12 upon which is mounted a supporting bracket 14 pivoted on the panel by a pivot bolt 16 threaded into the panel 12. The supporting bracket 14 is maintained in position and adjusted about its pivot by an adjusting arm 18 pivotally secured to the bracket 14 at a point spaced from the pivot point 16 as indicated at 20, and the other end of the adjusting arm is supported on the panel 12 by a bracket 22. The adjusting arm 18 is reciprocated to the right or left by means of a control point adjustment screw 24 and a compression spring 26 acting on the arm 18 through the bracket 22.

A bleed nozzle construction in the form of a block 28 is mounted on the bracket 14 and contains two chambers 30 and 32 with a fixed orifice 34 interconnecting the two chambers, and a nozzle or bleed port 36 opening from the chamber 32 to atmosphere. A projection 38 extends from the block 28 for supporting a permanent magnet 40, the magnet 40 being adjustable by bolt 42 threaded in the projection 38.

The bleed port 36 is adapted to be closed by one end of a flat spring steel flapper 44 which is pivotally secured at its other end to a Bourdon tube 46. A fixed pivot post 48 is secured to the supporting bracket 14 adjacent to the flapper 44 and intermediate its ends. The Bourdon tube 46 is fixedly secured at one point to the panel 12 by a bracket 50, but it is otherwise free for movement. An adjustable stop 52 is mounted in a lug 54 on the supporting bracket 14 opposite the bleed port 36 for limiting the extent to which the flapper 44 can be moved away from the port 36.

An air line 56 is connected to any convenient source of compressed air at 58 and is provided with a standard gas pressure regulator 60 for maintaining a constant air pressure. The line 56 leads into chamber 30 of the nozzle block 28 and another air line 62 leads to a diaphragm motor valve 64 interposed in an oil line 66 leading from an oil well 68. The valve 64 may be of any desired diaphragm type and is held normally closed by spring 70 when air pressure is released from chamber 72 therein under diaphragm 74. Pressure on being built up in the chamber 72 opens the valve.

The oil well is operated by an independent source of compressed air in an air line 76 which is connected with the well casing 78. When sufficient air pressure is built up in the well casing it forces oil out the oil line 66. Another air line 80 leads off the line 76 and is connected to the Bourdon tube 46 which is hollow and uncoils when air pressure is built up within it and recoils when the pressure drops.

Fig. 1 shows the flapper 44 against the nozzle or bleed port 36 and closing the same. Compressed air from the line 56 enters chamber 30 and from there the chamber 32, and since the bleed port 36 is closed, air pressure builds up through the line 62 to the chamber 72 in the diaphragm motor valve 64. This then operates the valve 64 and unseats it. When there is sufficient compressed air in the line 76 and in the well casing 78 to force the oil out of the well, the air pressure in the line 80 builds up in the Bourdon tube which expands. The Bourdon tube in expanding actually uncoils, that is, its point of connection with the flapper 44 moves to the right. When the pressure drops and the Bourdon tube recoils, its point of connection with the flapper 44 moves to the left. When the Bourdon tube recoils it operates the flapper 44 about a fixed pivot 48 and moves the opposite end of the flapper 44 off of the bleed port 36 and permits the air from chamber 32 to bleed to atmosphere. Then the pressure in the diaphragm motor valve 64 drops and the valve closes.

The flapper 44 is attracted to closed position against the bleed port 36 by the permanent magnet 40. This magnet is adjustable by means of threaded bolt 42 toward and away from the flapper 44. Adjustable stop 52 is for limiting the movement of the flapper 44 in the opening direction.

The pilot is operable within certain set maximum and minimum limits of air pressure in the well casing 78. To vary the range between the the maximum and the minimum limits, the permanent magnet 40 is moved toward and away from the flapper 44. When the magnet 40 is moved toward the flapper 44 the range of operation is widened, and when it is moved away from the flapper 44 the range is narrowed. For positioning the range without varying the extent of the range, the arm 18 is moved to the right or left by the screw head 24. When it is moved to the left it lowers the range, that is, it sets the pilot to operate at lower pressures, both minimum and maximum. By moving the arm 18 to the left the fixed pivot 48 being also moved to the left, the air pressure in the Bourdon tube 46 must be lowered still more in order to recoil sufficiently to move the flapper off of the bleed port 36. Also the maximum limit of air pressure need not be so great, that is Bourdon tube 46 need not uncoil to such a great extent in order to take the tension off the flapper 44 to permit it to be attracted to port closing position by the magnet 40.

The flapper 44 is flexible steel and because of this characteristic snapping action takes place. When the Bourdon tube 46 recoils, tension is built up in the flexible flapper 44. The Bourdon tube does not move the flapper off the bleed port 36 gradually because the attraction of the magnet 40 is greater than the initial tension in the flapper; but when tension in the flapper 44 becomes great enough that it is unseated off of the bleed port 36, it unseats by snapping action because of the sudden loss of the attraction force of permanent magnet 40. The force of a magnet on an object varies inversely with the square of the distance from it, and once the flapper is moved a distance away from the magnet it is out of its effective range.

The pilot is operable and useful in connection with oil wells whether they are operated by artificial supply of air pressure, or by a natural supply of pressure from within the well itself. When the pressure is built up sufficiently the valve 64 opens and oil flows. In the case of wells operated by a natural supply of air pressure, the pressure is not always constant, but builds up at intervals and the intervals are not always uniform. The pilot eliminates the timing element and causes the well to flow only when sufficient pressure has built up in the well casing.

In adapting the pilot to a well which is operated by natural gas pressure in the well, the gas from the well is used in the line 80 for operating the Bourdon tube, as shown in the drawings, and it is also used in the line 56 as an operating medium for opening the valve 64. It will be understood, therefore, that any reference to air pressure will include both an artificial supply of compressed air and natural gas pressure from the well, and this is true whether such reference is in the specification or claims.

The pilot is adapted to be reversed. The arrangement shown in Fig. 1 provides that the pressure is bled from the diaphragm valve 64 on decrease of control pressure in the line 80; and the valve 65 of Fig. 2 is bled on increase of control pressure in the line 80. In Fig. 2 the nozzle block 28 and the magnet 40 are reversed to the opposite side of the flapper 44, as are also the adjustable stop 52 and the fixed pivot 48. When air pressure is built up in the Bourdon tube 46 from the air line 80 it uncoils and unseats the flapper 44 off the bleed port 36; and when the air in the chamber 32 then bleeds to atmosphere it releases the pressure in the motor diaphragm valve 65 and permits it to be opened by the spring 70. When the air pressure drops in the Bourdon tube 46 it recoils, moving to the left, and permits the flapper to be attracted to the port closing position by the magnet 40, builds up pressure in the valve 64 and closes it.

The air lines 56 and 62 at their points of connection with the nozzle block 28 are flexible, so as to accommodate placing the nozzle block in its alternate positions, as well as to allow for its angular movement when the supporting bracket 14 is adjusted. The valve 65 is the reverse of valve 64, the former being normally held open by the spring 71 and closed by the air pressure on the diaphragm 75.

It is intended that the arrangement of either Fig. 1 or Fig. 2 can be used with other than oil wells. For example, an independent source of air pressure can be supplied to the line 80 and Bourdon tube 46, and the valve 64 or 65 can be used in any line in which there is a flow of fluid.

An embodiment of the snap acting pilot as applied to liquid level controls is shown in Fig. 3. In this embodiment a supply of compressed air is connected to the line 82 which is provided with a standard gas pressure regulator 84 for assuring a constant pressure. This line 82 leads to nozzle block 86 and the chamber 88 (see Fig. 5) therein from which a fixed orifice 90 leads to another chamber 92. From the chamber 92 a bleed port 94 leads to atmosphere. From the chamber 92 a line 96 leads to diaphragm motor valve 98 to the chamber 100 therein under the diaphragm 102. The valve 98 is held normally closed by a spring 104 and is opened when air pressure is built up in the chamber 100.

The pilot equipment is mounted on a supporting panel 106 upon which are mounted two supporting brackets 108 and 110. In the arrangement of Fig. 3 the nozzle block is mounted on the bracket 108. A permanent magnet 112 is positioned near the bleed port 94 and is mounted in place by an arrangement shown in Fig. 4. The magnet 112 is secured by bolt 114 extending through the magnet and through a flexible strip 116 into bolt 118 which has an enlarged block at its outer end. Bolt 118 is threaded into the shank of the screw 120 which in turn is threaded into a bar 122. The bar 122 is secured to the nozzle block 86 by means of bolt 124. By this arrangement the magnet 112 is adjustable in a line parallel with the nozzle block 28 by turning the thumb screw 120.

A level adjustment mechanism is indicated generally at 126 and contains a metal flapper 128 adapted to close the bleed port 94 and is attracted to port closing position by the magnet 112. Reference may be had to Figs. 6 and 7 for a showing of the proper mounting of the level control 126. The numeral 130 indicates a water supply tank which is fed by the line 132 supplied from a convenient water source and in which valve 98 is interposed. The tank 130 is provided with a float 134. Fig. 8 is a horizontal cross section looking down at the float 134 and on change of level of the water in the tank it moves toward and away from the observer. An arm 136 is connected to the float 134 and is connected with a rotary shaft 138. The level control device is secured to the outer end of the rotary shaft 138 by means of flange 140 which is bolted to flange 142 mounted on the level control mechanism 126. A shaft 144 is loosely mounted in the body 146 of the level control 126 and through the front face 148. The flapper 128 is loosely mounted on the shaft 144. A clip 150 having two lateral ears 152 is pivotally mounted at 154 on the body 146, one ear 152 being on each side thereof. A threaded bolt 156 having an eyelet 158 at one end thereof is inserted in an opening in the clip 150 and is provided with a pin 160 through the eyelet and extends through the front face 148. A knurled knob 162 is threaded onto the other end of the bolt 156. A compression spring 164 biases the clip 150 outwardly from the front face 148. The side ears 152 are provided with camming surfaces 166 which are raised and lowered as the clip 150 is rotated about its pivot point 154. As the knurled knob 162 is turned on the threaded bolt 156 one way or the other the clip 150 is brought toward or let out from the front face 148, thereby raising or lowering the camming surfaces 166. The metal flapper 128 extends outwardly from the level control device 126 to the left, as shown in Fig. 3 and this flapper also may be flipped over to extend out to the right, resting on one of the camming surfaces 166 depending on which direction it extends. On the outer surface of the front face 148 is a dial 168 to mark settings for the knob 162. In the arrangement of Fig. 3 the flapper 128 extends to the left to cover and close the escape port 94 and is attracted to port closing position by the magnet 112. An adjustable stop 170 is secured to the supporting bracket 108 opposite the bleed port 94 to limit the extent to which the flapper 128 can be moved off the escape port 94.

At any given setting of the knob 162, as the water level in the tank 130 rises, the float 134 rises rocking the arm 136 and also the rotary shaft 138. When the water level reaches a predetermined height the level control 126 is rotated clockwise as shown in Fig. 3, raising the flapper 128 off of the bleed port 94 and permitting the escape of air pressure from the interior of the nozzle block 86. Air pressure thereby also escapes from under the diaphragm 102 in the valve 98 permitting the valve to be closed under the action of the spring 104, and cutting off the flow of the water to the tank 130. When the water lowers to a predetermined level the rotary shaft 138 and the level control device 136 is rotated counterclockwise as viewed in Fig. 3. When this motion has continued a sufficient extent the pressure of the camming surface 166 is released from the flapper 128 and the magnet 112 attracts the flapper 128 to port closing position as shown in Fig. 3. This then builds up the air pressure through the nozzle block 86 to the valve 98 and opens the valve, permitting water to flow to the tank 130.

As with the pilot in Figs. 1 and 2, this pilot is also snap acting. While the flapper 128 itself is not flexible, torsion in the rotary shaft 138 is utilized for producing snap action. Energy is built up in the rotary shaft 138 by rotating against the force of the magnet 112 which tends to hold the flapper 128 in port closing position. Energy is built up in the shaft 138 to overcome the attraction of the magnet 112, and once that attraction is overcome the flapper moves away from the magnet by a snap action as described in connection with Fig. 1.

Also as in the instance of Figs. 1 and 2, this pilot is adjustable for varying the maximum and minimum levels in the tank 130. When the magnet 112 is moved toward the flapper 128 the range between the upper and the lower levels is increased, and when the magnet 112 is moved away from the flapper 128, the range between the maximum and the minimum level is decreased.

To position the range without varying the extent of the range itself, the level control device 126 is adjusted. By turning the knob 162 counterclockwise as viewed in Fig. 3 both the maximum and the minimum levels are raised. By so turning the knob 162 the clip 150 is permitted to swing away from the front face 148 lowering the camming surface 166 and also lowering the flapper 128. In order for the float mechanism to lift the flapper off the bleed port 94 it must then rise to an additional height to unseat the flapper 128. The reverse is also true; when the camming surface 166 is raised to a higher position, the level of the water need not rise to such a great height to unseat the flapper.

Air pressure meters can be attached to lines 83 and 97 to indicate the pressures in the respective lines 82 and 96.

This pilot is also reversible as is the pilot shown in Figs. 1 and 2. The air lines 82 and 96 extend across the supporting panel 106 and can be tapped at either of the brackets 108 or 110. The nozzle block 86 and the magnet assembly 112 can be mounted on the bracket 110 as shown in Fig. 8 and the lines 96 and 82 tapped for connecting up to the nozzle block 86. In this instance the flapper 128 is flipped over to the right to close the escape port 94, and is held in closed position by the magnet 112 in its new position. In this arrangement, when the water level in the tank 130 has reached its upper limit the flapper 128 is in port closing position as shown in Fig. 8, thereby building up air pressure through the nozzle block 86 to the motor diaphragm valve 99. The valve 99 is the reverse of the valve 93. Valve 99 is held normally open by the spring 105 when pressure builds up in the chamber 101 it operates the diaphragm 103 to close the valve. When the level of water in the tank 130 lowers, it rotates the level control device 126 counterclockwise, and when it reaches its lower limit it trips the flapper 128 off the bleed port 94. This permits the air pressure to escape from the line 96 and the valve 99, allowing the valve 99 to be opened and water to enter the tank 130. In this arrangement in order to raise the respective levels at which the pilot will operate, the knob 162 is turned in a clockwise direction. This tightens the knob 162 drawing the clip 150 toward the front face 148 and raising the camming surface 166. When the camming surface is raised to a higher position, the water level must rise to a greater height to rotate the level control device 126 sufficiently for the flapper 128 to close the escape port 94. In a like manner, when the camming surface 166 is adjusted to a lower position the flapper 128 rests lower, and the water level need not rise so high to permit the flapper to come to port closing position. The dial 168 is reversible for indicating which direction to turn knob 162 for raising the liquid level in the different positions of the device.

While I have herein shown and described a preferred embodiment of my invention, manifestly it is susceptible of modifications and rearrangement of parts without departing from the spirit and scope thereof. I do not, therefore, wish to be understood as limiting this invention to the precise form herein disclosed, except as I may be so limited by the appended claims.

I claim as follows:

1. A device for use with a conduit system to control flow therethrough in predetermined relationship to a varying fluid pressure, said device comprising a first support, a second support swingably connected to said first support, means for adjusting the angular relationship of said two supports, a conduit having a port carried by said second support and adapted to be connected to said conduit system for discharge through said port of fluid flowing from said conduit system, a lever pivoted on said second support at a point spaced from the point where said second support is swingably connected to said first support and having an end portion swingable in opposed relationship to said port to open and close said port, a Bourdon tube having one end mounted on said first support and responsive to said varying fluid pressure, the other end of said Bourdon tube being connected to said lever adjacent the lever pivot point, and adjustable stop means carried by said second support for limiting lever movement away from said port.

2. A device for use with a conduit system to control flow therethrough in predetermined relationship to a varying fluid pressure, said device comprising a first support, a second support swingably connected to said first support, a link of adjustable length having one end pivotally connected to said second support and having its other end mounted on said first support and operative on adjustment of the link length to vary the angular relationship between said two supports, a conduit having a port carried by said second support and adapted to be connected to said conduit system for discharge through said port of fluid flowing from said conduit system, means for closing said port including a flapper carried by said first support and swingable to and from said port, a stop member carried by said second support for limiting port opening movement of said flapper, and pressure sensitive means carried by said first support responsive to said varying fluid pressure and operative to actuate said flapper.

3. A device for use with a conduit system to control flow therethrough in predetermined relationship to a varying fluid pressure, said device comprising a first support, a second support swingably connected to said first support, a link of adjustable length having one end pivotally connected to said second support and having its other end mounted on said first support and operative on adjustment of the link length to vary the angular relationship between said two supports, a conduit having a port carried by said second support and adapted to be connected to said conduit system for discharge through said port of fluid flowing from said conduit system, means for closing said port including a flapper for said second support, a stop member carried by said second support for limiting port opening movement of said lever, and pressure sensitive means carried by said first support responsive to said varying fluid pressure and operative to actuate said flapper for port closing movement, said link extending in general parallelism with the direction of motion of said flapper, said flapper extending generally transversely to said link, and the pivotal connection between said two supports being disposed generally in the plane of said flapper extending transversely of said second support.

GLENN F. BROCKETT.

REFERENCES CITED

The following references are of record in the file of this patent:

UNITED STATES PATENTS

| Number | Name | Date |
|---|---|---|
| 468,440 | Fortier | Feb. 9, 1892 |
| 982,229 | Adair | Jan. 24, 1911 |
| 1,412,773 | Colgate | Apr. 11, 1922 |
| 1,606,355 | Fisher | Nov. 9, 1926 |
| 1,641,944 | Bristol | Sept. 6, 1927 |
| 1,875,511 | Shivers | Sept. 6, 1932 |
| 2,047,581 | Gissett | July 14, 1936 |
| 2,185,671 | Kimbull | Jan. 2, 1940 |
| 2,263,771 | Griffey | Nov. 25, 1941 |
| 2,264,262 | Erbgutti | Nov. 25, 1941 |
| 2,298,112 | Edwards | Oct. 6, 1942 |
| 2,332,627 | Erguth | Oct. 26, 1943 |
| 2,356,970 | Brockett | Aug. 29, 1944 |
| 2,427,235 | Smoot | Sept. 9, 1947 |

FOREIGN PATENTS

| Number | Country | Date |
|---|---|---|
| 74,521 | Austria | of 1918 |
| 589,617 | Germany | of 1933 |